3,399,241
PROCESS FOR PREPARING 2,4,4,4-TETRACHLO-
ROBUTANOL FROM ALLYL ALCOHOL AND
CCl₄ IN THE PRESENCE OF POWDERED IRON
CATALYST
Eric Smith, New Haven, Conn., assignor to Olin Mathieson Chemical Corporation, a corporation of Virginia
No Drawing. Filed Feb. 26, 1964, Ser. No. 347,389
8 Claims. (Cl. 260—633)

ABSTRACT OF THE DISCLOSURE

Carbon tetrachloride and allyl alcohol are reacted in the presence of an improved catalyst system comprised of either powdered iron or a mixture of powdered iron and anhydrous ferric chloride to increase the yield of 2,4,4,4-tetrachlorobutanol. The resulting alcohol product may be reacted with an aqueous lime slurry to produce 4,4,4-trichlorobutylene oxide.

---

The present invention relates to a new and improved process for the preparation of 2,4,4,4-tetrachlorobutanol. More particularly, the present invention relates to novel catalysts employed in the preparation of 2,4,4,4-tetrachlorobutanol by the reaction of carbon tetrachloride and allyl alcohol.

2,4,4,4-tetrachlorobutanol is an extremely versatile compound with a wide range of utility. It reacts in a manner typical of aliphatic alcohols, and its chlorinated nature renders it extremely desirable where high chlorine content is needed, for example, as a component of pesticides in agricultural applications and the like. In addition, 2,4,4,4-tetrachlorobutanol may be readily dehydrohalogenated to yield 4,4,4-trichloro-butylene oxide, which is a reactive, high chlorine-containing epoxide useful in the preparation of epoxy resins, lubricants, polyurethane foams, and the like. 2,4,4,4-tetrachlorobutanol may also be used to prepare chlorinated terephthalate esters suitable for use in high temperature lubricants, to prepare chlorinated acrylates for use in the preparation of flame resistant acrylic resins, and for use as a plasticizer in flame resistant resins, and the like.

U.S. Patent No. 2,440,800, issued to William E. Hanford et al. on May 4, 1948, and U.S. Patent No. 2,568,859, issued to Elbert C. Ladd et al. on Sept. 25, 1951, both disclose processes in which a polymerizable aliphatic monoolefinic hydrocarbon such as ethylene is reacted with carbon tetrachloride in the presence of a free radical providing promoter such as benzoyl peroxide, ultraviolet light, and the like. While such a process is satisfactory in the reaction of hydrocarbons such as ethylene, these promoters are unsatisfactory in the reaction of olefinic alcohols such as allyl alcohol with carbon tetrachloride. In fact, substantially no conversion of the allyl alcohol to 2,4,4,4-tetrachlorobutanol is obtained when these free radical source promoters are employed. Other processes for preparing 2,4,4,4-tetrachlorobutanol from allyl alcohol are not entirely satisfactory because of the expensive reagents employed in carrying out the reaction or because of the low yields obtained because of the ineffectiveness of the catalysts employed, or because expensive high pressure equipment or high temperatures are necessary to effect the reaction.

In Chemistry and Industry, Feb. 3, 1962, pages 209–210, there is an article entitled "Chlorine Activation by Redox-Transfer. Addition of Carbon Tetrachloride and Chloroform to Olefins," by M. Asscher and D. Vofsi, which discloses the reaction of carbon tetrachloride and olefins, such as but-2-ene, in the presence of a catalyst such as copper, iron, copper chlorides, or iron chlorides in the presence of various solvents such as methanol. Although ferric chloride is alleged to be a very effective catalyst for the reaction between carbon tetrachloride and but-2-enes, such a catalyst, when employed as the sole catalyst, has substantially no effect on the reaction of carbon tetrachloride and allyl alcohol to yield 2,4,4,4-tetrachlorobutanol. A "catalyst" mixture of copper and cupric chloride likewise had substantially no effect on the reaction.

It is an object of the present invention to overcome defects presently inherent in prior art processes for the preparation of 2,4,4,4-tetrachlorobutanol from allyl alcohol and carbon tetrachloride.

Another object of the invention is to provide an improved process for preparing 2,4,4,4-tetrachlorobutanol employing a relatively inexpensive, readily available catalyst system.

A further object of the invention is to provide an improved catalyst system for the process of preparing 2,4,4,4-tetrachlorobutanol from carbon tetrachloride and allyl alcohol.

Still another object of the invention is to provide a novel process for preparing 2,4,4,4-tetrachlorobutanol from carbon tetrachloride and allyl alcohol in which the use of expensive high pressure equipment and high operating temperatures are eliminated without the formation of undesirable by-products.

These and other objects of the invention will be apparent from the following detailed description of the invention.

In accordance with the present invention, it has now been found that the foregoing objects of the present invention may be accomplished, and that 2,4,4,4-tetrachlorobutanol can be prepared in good yield by reacting carbon tetrachloride and allyl alcohol in the presence of a catalytic proportion of powdered iron, which is preferably admixed with ferric chloride.

More in detail, carbon tetrachloride is reacted with allyl alcohol in the presence of a catalytic proportion of the catalyst in a proporation equivalent to a molar ratio of carbon tetrachloride to allyl alcohol of between 1:1 and about 10:1, and preferably between about 2:1 and about 4:1. However, greater or lesser proportions may be employed if desired.

The catalyst employed in carrying out the reaction is powdered iron alone, or preferably a mixture of iron powder and ferric chloride, the catalyst mixture being employed in any catalytic proportion that is capable of increasing the reaction rate. Typical range of proportions and preferred range of proportions of the components in the catalyst or catalytic mixture, as the case may be, which may be employed in the reaction are as follows:

| Catalyst component | Range of typical proportions, percent by weight | Range of preferred proportions, percent by weight |
|---|---|---|
| Powdered iron | 40–100 | 40–80 |
| Ferric chloride | 0–60 | 20–60 |

The powdered iron component of the catalytic mixture is comprised of particles all of which pass a 50 mesh screen and preferably all of which pass a 150 mesh screen. Particles having a diameter larger than plus 50 mesh may be employed, but the catalytic effect of these larger particles is reduced because of the smaller surface area. When powdered iron alone is employed, there is an induction period, for example, of about five hours, before the catalytic effect is obtained. However, when ferric chloride is admixed with powdered iron, the induction period is substantially eliminated despite the fact that ferric chloride alone has substantially no catalytic effect on the reaction.

Any type of iron can be employed as a catalyst in this process. For example, elemental iron, stainless steel, wrought iron, mixtures thereof and the like, preferably in powdered form, may be employed as a catalyst.

When ferric chloride is employed as a component of the catalyst mixture, it is added in anhydrous form.

Any suitable catalytic proportion of the catalytic mixture may be employed in carrying out this reaction. Satisfactory results are generally obtained when the proportion of catalyst or catalytic mixture, as the case may be, is between about 1 and about 30, and preferably between about 5 and about 20 percent by weight of the allyl alcohol reactant.

Any convenient order of mixing of the reactants and catalyst may be employed. For example, all of the reactants and the catalyst may be added simultaneously to the reactor, the reactor contents are then agitated and heated under reflux until the reaction has attained the desired degree of completion. However, it is preferred to admix the carbon tetrachloride and allyl alcohol, both in anhydrous condition, in the reactor first and then add the powdered iron and, if desired, the ferric chloride.

After the reactants and catalytic mixture have been added to the reactor with agitation, the reaction mass is heated under reflux at a temperature in the range between about 60 and about 100° C. at autogenous pressure, and preferably between about 65 and about 95° C.

The reaction time is generally between about 3 and about 12 hours, and preferably between about 5 and about 8 hours, but shorter or longer time periods may be employed if desired.

After the refluxing step has been completed, during which time hydrogen chloride and water are formed in side reactions along with the formation of an organic phase containing 2,4,4,4-tetrachlorobutanol, the residue is cooled to substantially room temperature and solids are removed therefrom by filtration or other convenient solids-liquid separation technique. The solids are formed from unreacted catalysts or reaction products of the catalyst. The resulting filter cake is washed with carbon tetrachloride and then discarded, the carbon tetrachloride wash being added to the filtrate. The filtrate and wash solution are combined and washed with water to remove soluble salts and to reduce the catalyst effectiveness. The aqueous phase is then separated from the resulting organic layer. The organic layer may be subjected to fractional distillation under reduced pressure to yield an initial carbon tetrachloride fraction having a boiling point of 76.8° C. at 760 millimeters of mercury, an allyl alcohol fraction at 97.1° C. at 760 millimeters of mercury, and a tetrachlorobutanol fraction at about 84° C. at 1 millimeter of mercury. The distillation residue is discharged to waste.

The process of this invention is also effective in preparing 2,4,4,4-tetrabromo- or 2,4,4,4-tetraiodobutanol from carbon tetrabromide or carbon tetraiodide, respectively.

When it is desired to prepare 4,4,4-trichlorobutylene oxide from the 2,4,4,4-tetrachlorobutyl alcohol component, the crude organic layer prepared as described above, prior to distillation, may be reacted with an aqueous $Ca(OH)_2$ slurry to yield the corresponding butylene oxide. The bromo- and iodo-substituted butylene oxides can be prepared from the corresponding alcohols in the same manner.

The following examples are presented to define the invention more fully without any intention of being limited thereby. All parts and percentages are by weight unless otherwise specified.

EXAMPLE 1

A mixture of carbon tetrachloride (230.8 g.), allyl alcohol (29.0 g.), and iron powder (250 g. of −100 mesh) was refluxed with stirring in glass apparatus. The liquid temperature was 73° C. After 7½ hours, the mixture was analyzed by vapor fractometry and was found to contain 20.46 percent of 2,4,4,4-tetrachlorobutanol and 2.0 percent of allyl alcohol. The conversion of allyl alcohol was calculated to be 83 percent and the uncorrected yield of 2,4,4,4-tetrachlorobutanol was 46.9 percent based on the allyl alcohol charged.

For purposes of comparison, a similar experiment was carried out using similar quantities of carbon tetrachloride and allyl alcohol, without the addition of iron. After 7½ hours, no 2,4,4,4-tetrachlorobutanol was detected in the reaction mixture.

EXAMPLES 2–4

A mixture of carbon tetrachloride (461.6 g.), allyl alcohol (58.1 g.), and iron powder catalyst (5.0 g. of −100 mesh) was refluxed for 10 hours and samples were withdrawn for analysis every 2½ hours. A similar experiment was conducted at the same time using anhydrous ferric chloride (5.0 g.) in place of the iron powder. A third experiment was also conducted, using a mixture of iron powder (5.0 g.) and anhydrous ferric chloride (5.0 g.) as catalyst. The samples of reaction mixture were analyzed by vapor fractometry and the following results were obtained:

| Example | Catalyst | Catalyst weight, grams | Reflux time, hours | Allyl alcohol in product | | 2,4,4,4-tetrachlorobutanol in product | |
|---|---|---|---|---|---|---|---|
| | | | | Percent by weight | Percent conversion | Percent by weight | Percent yield (uncorrected) |
| 2a | Iron powder | 5 | 2½ | 12.9 | 0 | 0 | 0 |
| 2b | do | 5 | 5 | 11.5 | 0 | 0 | 0 |
| 2c | do | 5 | 7½ | 6.2 | 44.6 | 9.95 | 24.4 |
| 2d | do | 5 | 10 | 0.8 | 92.8 | 24.97 | 61.3 |
| 3a | Ferric chloride | 5 | 5 | 11.5 | 0 | 0 | 0 |
| 3b | do | 5 | 10 | | | 0.33 | 0.81 |
| 4a | {Iron powder / Ferric chloride} | 5 / 5 | 2½ | 7.5 | 32.7 | 7.31 | 17.9 |
| 4b | {Iron powder / Ferric chloride} | 5 / 5 | 5 | 1.2 | 89.2 | 21.49 | 52.7 |
| 4c | {Iron powder / Ferric chloride} | 5 / 5 | 7½ | 0.8 | 92.8 | 24.4 | 59.8 |
| 4d | {Iron powder / Ferric chloride} | 5 / 5 | 10 | 0.7 | 94.0 | 23.84 | 58.3 |

From these results it can be seen that the reaction catalyzed by iron alone (Example 2a, 2b, 2c and 2d) undergoes an induction period of about 5 hours' duration, before reaction occurred. The induction period can be eliminated and reaction time reduced, by the use of ferric chloride in conjunction with iron (Example 4a, 4b, 4c and 4d). Ferric chloride alone does not catalyze this reaction, to any appreciable extent (Example 3a and 3b).

Various modifications of the invention may be employed, some of which have been referred to above, without departing from the spirit or scope of the invention.

What is desired to be secured by Letters Patent is:

1. In the process for preparing 2,4,4,4-tetrachlorobutanol by the reaction of carbon tetrachloride and allyl alcohol, the improvement which comprises adding to the reaction in a catalytic proportion a catalyst consisting essentially of powdered iron, while employing a reaction temperature in the range between about 60 and about 100° C. at autogenous pressure, and employing a reaction period of at least 7.5 hours.

2. The process of claim 1 wherein the proportion of powdered iron is between about 5 and about 20 percent by weight of the alcohol present.

3. In the process for preparing 2,4,4,4-tetrachlorobutanol by reacting carbon tetrachloride and allyl alcohol, the improvement which comprises employing a catalytic proportion of a catalyst mixture consisting essentially of powdered iron and anhydrous ferric chloride, while employing a reaction temperature in the range between about 60 and 100° C. at autogenous pressure.

4. The process of claim 3 wherein the proportion of said catalytic mixture is between about 1 and about 30 percent by weight of the allyl alcohol employed as a reactant, wherein the weight percent of powdered iron in the catalyst mixture is in the range between about 40 and about 100 percent, and the weight percent of anhydrous ferric chloride in the catalyst mixture in the range between about 0 and about 60 percent by weight of said catalytic mixture.

5. The process of claim 3 wherein the proportion of said catalytic mixture is between about 5 and about 30 percent by weight of the allyl alcohol employed as a reactant, wherein the weight percent of powdered iron in the catalyst mixture is in the range between about 40 and about 80 percent, and the weight percent of anhydrous ferric chloride in the catalyst mixture in the range between about 20 and about 60 percent by weight of said catalytic mixture.

6. The process of claim 3 wherein the molar ratio of carbon tetrachloride to allyl alcohol is in the range between about 2:1 and about 4:1.

7. The process of claim 3 wherein the temperature of the liquid phase of the reaction is maintained in the range between about 65 and about 95° C.

8. In the process for preparing 2,4,4,4-tetrachlorobutanol by reacting carbon tetrachloride and allyl alcohol, the improvement which comprises employing a catalytic proportion of a catalyst mixture consisting essentially of powdered iron and anhydrous ferric chloride, the molar ratio of carbon tetrachloride to allyl alcohol being in the range between about 2:1 and about 4:1, the weight percent of powdered iron in the catalytic mixture being in the range between about 40 and about 80 percent by weight, and the weight percent of anhydrous ferric chloride in the catalytic mixture being in the range between about 20 and about 60 percent by weight of the catalyst mixture, the proportion of catalytic mixture being in the range between about 5 and about 20 percent by weight of the allyl alcohol employed as a reactant, and the temperature of the liquid phase being maintained in the range between about 65 and about 95° C. at autogenous pressure.

References Cited

UNITED STATES PATENTS

| | | | |
|---|---|---|---|
| 2,401,099 | 5/1946 | Peterson | 260—654 |
| 2,440,800 | 5/1948 | Hanford et al. | |
| 2,568,859 | 9/1951 | Ladd et al. | |
| 2,658,930 | 11/1953 | Thompson. | |

FOREIGN PATENTS

| | | |
|---|---|---|
| 123,885 | 5/1944 | Australia. |
| 527,462 | 7/1956 | Canada. |
| 244,066 | 1/1960 | Australia. |
| 1,334,749 | 7/1963 | France. |

OTHER REFERENCES

Asscher et al. II, J. Chem. Soc., March 1963, pp. 1887–1896.

BERNARD HELFIN, *Primary Examiner.*

H. MARS, *Assistant Examiner.*